United States Patent [19]

Jackovitz et al.

[11] 4,356,101

[45] Oct. 26, 1982

[54] IRON ACTIVE ELECTRODE AND METHOD OF MAKING SAME

[75] Inventors: John F. Jackovitz, Monroeville; Joseph Seidel, Pittsburgh; Earl A. Pantier, Verona, all of Pa.

[73] Assignee: Westinghouse Electric Corp., Pittsburgh, Pa.

[21] Appl. No.: 254,708

[22] Filed: Apr. 16, 1981

[51] Int. Cl.$^3$ .......................... H01M 4/52; H01M 4/08
[52] U.S. Cl. .................................. 252/182.1; 252/513; 252/519; 429/221
[58] Field of Search ..................... 252/182.1, 513, 519; 429/221

[56] References Cited

U.S. PATENT DOCUMENTS

| | | | |
|---|---|---|---|
| 3,507,696 | 4/1970 | Jackovitz et al. | 429/221 |
| 3,702,019 | 11/1972 | Pollack | 429/223 |
| 3,853,624 | 12/1974 | Brown et al. | 429/221 |
| 3,895,960 | 7/1975 | Brown et al. | 429/221 |
| 3,947,292 | 3/1976 | Jackovitz | 429/221 |
| 3,992,222 | 11/1976 | Walsh et al. | 429/221 |
| 4,011,374 | 8/1977 | Kaun | 429/221 |
| 4,064,331 | 12/1977 | Patton | 429/221 |
| 4,078,125 | 3/1978 | Brown | 429/221 |

OTHER PUBLICATIONS

Research, Development and Demonstration of Nickel-Iron Batteries for Electric Vehicle Propulsion, Argonne Nat. Lab., (Jun. 1980), ANL-OEPM-79-14, p. 27.
Research, Development and Demonstration of Nickel-Iron Batteries for Electric Vehicle Propulsion, Argonne Nat. Lab., (Oct. 1979), ANL-OEPM-78-14, pp. 19, 20, 35.

*Primary Examiner*—Irwin Gluck
*Attorney, Agent, or Firm*—D. P. Cillo

[57] ABSTRACT

An iron active electrode and method of preparing same in which iron sulfate is calcined in an oxidizing atmosphere at a temperature in the range of from about 600° C. to about 850° C. for a time sufficient to produce an iron oxide with a trace amount of sulfate. The calcined material is loaded into an electrically conductive support and then heated in a reducing atmosphere at an elevated temperature to produce activated iron having a trace amount of sulfide which is formed into an electrode plate.

26 Claims, No Drawings

IRON ACTIVE ELECTRODE AND METHOD OF MAKING SAME

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to a new and improved iron active electrode and method of making same. It vastly reduces the amount of material required to be added to an iron electrode to prevent it from becoming passive upon charge and discharge.

It is generally known that an iron battery electrode plate in an alkali electrolyte functions because of oxidation of metallic iron to hydroxides or oxides of iron or both. The exact compositions of the oxidation compound or compounds are not completely known. Although the formation of $Fe(OH)_2$, $Fe_2O_3$, and/or $Fe(OH)_3$ has been postulated, $Fe_3O_4$ seems to be the most probable predominant compound.

The iron battery electrode plate is composed of a finely divided iron oxide powder, deposited or impregnated in a supportive plaque and compacted to a desired density. When pure iron oxide powder is used as an electrode active material in an alkali electrolyte, a battery has limited utilization due to the rapid formation of a passivating film on the iron surface.

To promote the charging of the compacted powder as well as to facilitate the discharging of the electrode plate, a reaction promoting additive for the electrode active material is needed. Such an additive should have the ability to activate the entire substance, though present in relatively small amounts. The properties of such an additive should approach those of a transfer catalyst, causing the breakdown of any protective film and thus keeping the iron active material surface in an active state.

Also known in the art is the addition of sulfur or sulfur-bearing materials, such as FeS as additives to iron oxide powder. These materials have been incorporated by physically mixing iron sulfide and the iron oxides and thereafter forming into an electrode. The Jackovitz et al. U.S. Pat. No. 3,507,696 issued Apr. 21, 1970 teaches the fusing of elemental sulfur, selenium or tellurium to the iron oxide particle surface so that subsequent separation of the phases does not occur during the preparation of the electrode plate. However, considerable quantities of the elemental sulfur, selenium or tellurium are required for admixture with the iron oxide to practice this invention. The method of mixing the elemental sulfur and the iron oxide taught in the Jackovitz et al. patent is time consuming with substantial quantities of flowers of sulfur being required for mixture with the iron oxide. Also temperature control is critical in the process there described and this requires careful attention.

Therefore, in view of these problems that have occured with the previous electrodes, it is an object of the present invention to provide an improved iron electrode structure wherein sulfur is present as an activating substance in trace amounts.

It is a further object of the present invention to provide an improved method for preparing an iron electrode.

SUMMARY OF THE INVENTION

In accordance with the present invention, an improved electrode is provided for use in an electrochemical cell. The electrode includes iron active material having sulfur uniformly distributed therethrough and present in trace amounts.

An important object of the present invention is to provide a method of preparing an electrode active material comprising calcining iron sulfate in an oxidizing atmosphere at a temperature in the range of from about 600° C. to about 850° C. for a time sufficient to produce an iron oxide with a trace amount of sulfate, heating the iron oxide with a trace of iron sulfate in a reducing atmosphere at an elevated temperature to produce activated iron having a trace amount of sulfide.

Another object of the present invention is to provide a method of the type set forth in which the iron sulfate is heated in air at a temperature of around 700° C. to provide an iron oxide having sulfate therein in an amount less than about 1% by weight of the iron oxide.

Still another object of the present invention is to provide a method of preparing an electrode active material in which carbonaceous material is added to the iron oxide and thereafter the iron oxide with the trace amount of sulfate and the carbonaceous material is heated in a reducing atmosphere at an elevated temperature to produce activated iron with a trace amount of sulfide and with carbon being present in an amount not less than about 1% by weight of the iron.

A still further object of the present invention is to provide a method of the type set forth in which the iron oxide with the trace amount of sulfate is loaded into an electrically conductive support and thereafter the loaded support is formed into an electrode plate.

Yet another object of the present invention is to provide a method of preparing an iron active electrode comprising calcining iron sulfate in an oxidizing atmosphere at a temperature in the range of from about 600° C. to about 850° C. for a time sufficient to produce an iron oxide with a trace amount of sulfate, adding carbonaceous material to the iron oxide, loading the iron oxide with the trace amount of sulfate and the carbonaceous material into an electrically conductive support, heating the iron oxide with the trace amount of sulfate and the carbonaceous material in a reducing atmosphere at an elevated temperature to produce activated iron with a trace amount of sulfide and with carbon being present in an amount not less than about 1% by weight of the activated iron, and forming the loaded support into an electrode plate.

Yet another object of the present invention is to provide an electrode comprising an electrically conductive structure carrying activated iron oxide having a trace amount of sulfate uniformly distributed therethrough.

A final object of the present invention is to provide an electrode comprising an electrically conductive support structure carrying activated iron having a trace amount of sulfide uniformly distributed therethrough.

These and other objects of the present invention may be more readily understood by reference to the following detailed description of the invention.

DETAILED DESCRIPTION OF THE INVENTION

It has been found that calcining iron sulfate under controlled conditions to produce iron oxide having trace quantities of sulfate therein results in an iron oxide which when converted into an appropriate electrode prevents the formation of a passivating film on the electrode surface. More specifically, we have discovered that iron sulfate may be calcined in an oxidizing atmosphere such as air at a temperature in the range of from about 600° C. to about 850° C., with the preferred temperature being very close to 700° C., to produce a sulfate doped iron oxide powder. This iron oxide powder has trace amounts of what is thought to be sulfate. The use of the term "sulfate" with respect to the iron oxide produced by calcining ferric sulfate is used to cover any form of sulfur combined or uncombined which may be present in the activated iron oxide. It is presently thought that at this point in the process the activated iron oxide has therein trace amounts of sulfate. Trace amounts generally are less than about 1% by weight of the iron oxide.

The trace amounts of sulfate which are effective to prevent a passivating film from forming on an electrode may be as little as 0.02% by weight of sulfur with respect to the activated iron. The sulfate because it is a chemical reaction residue is uniformly disbursed and intimately placed throughout the activated iron oxide, and as will be described throughout the activated iron. This is a significant improvement over the prior art which relied on mechanical mixing of substantially greater amounts of activation materials.

We have also found that controlled reduction of the activated iron oxide with trace amounts of sulfate produces an activated iron having trace amounts of sulfide. The use of the term "sulfide" is meant cover sulfur in combined or uncombined forms. It is not clear at the present time the exact chemical formula of the sulfur remaining in the iron after the reduction of iron oxide; however, sufficient "sulfide" values are present to prevent passivating film from forming during battery operation. The reduction is accomplished in a reducing atmosphere, preferably hydrogen, and at a temperature sufficiently low, such as 650° C., to prevent the iron particles from being sintered and agglomerating thereby reducing the total surface area and the effectiveness of the electrode.

It has also been discovered that providing a small amount of carbon in the final iron electrode improves the performance of the electrode by up to 25%. Amounts of carbon required to provide the improved performance in the final iron active electrode may be as little as 1% by weight of the iron with the preferred range being from about 1% to about 3%.

With respect to the calcination of the iron sulfate, as before stated, the effective temperature range is from about 600° C. to about 850° C., the preferred temperature being 700° C. plus or minus 5° C. Calcination of the ferrous or ferric sulfate at temperatures less than about 600° C. leaves behind significant sulfate concentrations which decreases the electrode efficiency due to the added weight of the sulfate. Operable electrodes are produced with calcination at the 600° C. level or lower but the efficiency of the reduced electrode is diminished. On the other hand, calcining iron sulfate at temperatures beyond 850° C. without some return of sulfur to the oxide results in an oxide which is sufficiently devoid of sulfate such that a passivating film forms resulting in an unsatisfactory electrode.

The carbon may be added by way of a phenolic resin or any other carbonaceous material such as corn starch or the like. It has been found that the increased electrode performance due to the presence of carbon in the activated iron electrode is obtained when carbon is present in an amount not less than about 1% by weight of the iron. The preferred range of carbon in the iron active electrode is in the range of from about 1% to about 3% of the iron, but up to 5% may be used with the only adverse effect being a lower cell efficiency due to excess weight. Where a phenolic resin is added to the activated iron oxide, it has been found that about 50% of the original phenolic resin is retained in the finished electrode as carbon, whereby the preferred range of phenolic resin present in the activated iron oxide is from about 2% by weight of the iron oxide to about 6% by weight.

In a typical example, 400 grams of $FeSO_4.7H_2O$ (MW=278) was heated in air for about 3 hours at a temperature of 700° C. plus or minus 5° C. After cooling, the residue was found to contain 116 grams of red orange $Fe_2O_3$ powder. The equation for the decomposition reaction is:

The red orange iron oxide powder is blended with 4.6 grams of a phenolic resin sold by the Borden Company under the tradename of DURITE ® and made into a fluid retentive paste using 66 grams of water and a few drops of a deflocculant, Darvan 7. The paste is milled for a few hours and rolled into a steel wool fiber plaque, of the type described in the Seidel U.S. Pat. No. 3,849,198, the Brown et al. U.S. Pat. No. 3,853,624, the Brown et al. U.S. Pat. No. 3,895,960 and the Brown U.S. Pat. No. 4,078,125, the disclosures of which are incorporated herein by reference. The steel wool fiber weights were 0.08 grams per centimeter square and a typical expanded iron metal center grid was used having a weight of 0.025 grams per centimeter square, all for a finished electrode 1 millimeter thick. The pasted electrode was then passed through a hydrogen sintering furnace maintained at 650° C. for about 2 hours.

The finished electrode plate contained about 0.02 grams per square centimeter of activated iron metal powder having about 2.83 weight percent carbon from the phenolic resin and sulfide in an amount of 0.02% by weight of the activated iron. The carbon weight percent was calculated based on the fact that 116 grams $Fe_2O_3$ contains 81.2 grams Fe and 4.6 grams of the phenolic resin leaves about 2.3 grams carbon after reduction, whereby the carbon to iron weight percent is 2.83. The finished plate was sized to 1 millimeter thickness and tested in a 25% potassium hydroxide electrolyte solution.

Various compositions were made according to the process herein before set forth, the results of which are reported in Table I.

TABLE I

Iron Electrode Performance Versus Iron Sulfate Calcination Temperature and Phenolic Resin Concentration For Electrodes Reduced at 650° C.

| Starting Material | Calcination Temperature (°C.) | Calcination Time (hours) | Sulfate Content of Calcined Material (wt %) | Phenolic Resin Content (wt %) | Amphere-hr gram Active Material (maximum) |
|---|---|---|---|---|---|
| $FeSO_4$ | 650 | 3 | 10.0 | 2 | 0.32 |
|  | 700 | 3 | 0.15 | 2 | 0.62 |
|  | 700 | 4 | 0.15 | 2 | 0.62 |
|  | 760 | 3 | 0.05 | 2 | 0.43 |
|  | 760 | 3 | 0.05 | 0 | 0.31 |
|  | 800 | 3 | ≈0.02 | 2 | 0.12 |
|  | 900 | 3 | 0 | 2 | 0.04 |
| $Fe_2(SO_4)_3$ | 650 | 3 | 10.3 | 4 | 0.30 |
|  | 700 | 3 | 0.16 | 2,4 | 0.58 .0.60 |
|  | 700 | 4 | 0.16 | 4 | 0.58 |
|  | 700 | 3 | 0.16 | 0 | 0.46 |
|  | 850 | 3 | ≈0.02 | 4 | 0.11 |
|  | 900 | 3 | 0 | 4 | 0.05 |

As can be seen from the Table, the most important parameter was the calcination temperature which should be maintained as close to 700° C. as possible. The calcining time was relatively unimportant as was the time for reducing the activated iron oxide to the activated iron metal. Additions of carbon by use of phenolic resin produced significantly improved results in the area of 20 to 25% improvement.

Although a thin 1 millimeter electrode was tested, thicker electrodes in the order of ¼ inch may be formed where necessary. While an aqueous paste was used to load the iron active material into the supporting plaque, a water slurry would likewise be satisfactory. An expanded iron metal center grid was used in the examples and this is a thin iron metal structure having diamond shaped openings, which structure is used both for strength and for improved conductivity.

Accordingly, it is clear that an iron active electrode and method of making same has been provided in which trace amounts of "sulfate" or "sulfide" remain in the activated iron oxide or iron metal sufficient to prevent a passivating film from forming on the electrode during battery operation. Effective trace amounts are less than 1 or 0.1% and may be as low as 0.02% by weight. The addition of a small amount of carbonaceous material which is mechanically mixed and substantially uniformly distributed through the activated material improves electrode performance between about 20 and 25%.

While there has been disclosed what at present is considered to be the preferred embodiment of the present invention, it will be appreciated that various modifications and alterations may be made therein without departing from the true scope of the present invention, and it is intended to cover within the claims appended hereto all such variations and modifications.

The embodiments of the invention in which an exclusive property or privilege is claimed are defined as follows:

1. A method of preparing an electrode active material comprising calcining iron sulfate in an oxidizing atmosphere at a temperature in the range of from about 600° C. to about 850° C. for a time sufficient to produce an iron oxide with a trace amount of sulfate, and heating the iron oxide with the trace amount of sulfate in a reducing atmosphere at an elevated temperature to produce activated iron having a trace amount of sulfide.

2. The method of claim 1, wherein the iron sulfate is calcined at a temperature in the range of from about 650° C. to about 750° C.

3. The method of claim 1, wherein the oxidizing atmosphere is air.

4. The method of claim 1, wherein the iron sulfate is calcined for a time period of less than about four hours.

5. The method of claim 1, wherein the iron oxide is heated in a reducing atmosphere of hydrogen.

6. The method of claim 1, wherein the elevated temperature at which the iron oxide is heated is not greater than about 650° C.

7. The method of claim 1, wherein the sulfide is present in an amount less than about 1% by weight of the activated iron.

8. The method of claim 1, wherein the sulfide present is present in an amount less than about 0.1% by weight of the activated iron.

9. A method of preparing an electrode active material comprising heating iron sulfate in air at a temperature of about 700° C. for a time sufficient to produce an iron oxide with a trace amount of sulfate, and heating the iron oxide with the trace amount of sulfate in a hydrogen atmosphere at an elevated temperature to produce activated iron having a trace amount of sulfide.

10. The method of claim 9, wherein the sulfide is present in an amount of less than about 1% by weight of the activated iron.

11. The method of claim 9, wherein the sulfide is present in an amount of less than about 0.1% by weight of the activated iron.

12. A method of preparing an electrode active material comprising calcining iron sulfate in an oxidizing atmosphere at a temperature in the range of from about 600° C. to about 850° C. for a time sufficient to produce an iron oxide with a trace amount of sulfate, adding carbonaceous material to the iron oxide, and heating the iron oxide with the trace amount of sulfate and the carbonaceous material in a reducing atmosphere at an elevated temperature to produce activated iron with a trace amount of sulfide and with carbon being present in an amount not less than about 1% by weight of the iron.

13. The method of claim 12, wherein the carbon is present in an amount not to exceed about 5% by weight of the iron.

14. The method of claim 12, wherein the carbonaceous material is substantially uniformly distributed throughout the iron oxide.

15. A method of preparing an iron active electrode comprising calcining iron sulfate in an oxidizing atmosphere at a temperature in the range of from about 600° C. to about 850° C. for a time sufficient to produce an iron oxide with a trace amount of sulfate, and loading the iron oxide with the trace amount of sulfate into an electrically conductive support.

16. A method of preparing an iron active electrode comprising calcining iron sulfate in an oxidizing atmosphere at a temperature in the range of from about 600° C. to about 850° C. for a time sufficient to produce an iron oxide with a trace amount of sulfate, loading the iron oxide with the trace amount of sulfate into an electrically conductive support, heating the iron oxide with the trace amount of sulfate in a reducing atmosphere at an elevated temperature to produce activated iron having a trace amount of sulfide, and forming the loaded support into an electrode plate.

17. The method of claim 16, wherein the support is metal fiber.

18. The method of claim 16, wherein the support is metal fiber with an expanded iron metal center grid.

19. The method of claim 16, wherein the sulfide is present in an amount less than about 1% by weight of the activated iron.

20. The method of claim 16, wherein the sulfide is present in an amount less than about 0.1% by weight of the activated iron.

21. The method of claim 16, wherein the iron oxide is formed into an aqueous paste and loaded into the support.

22. The method of claim 21, wherein a deflocculant is added to the aqueous paste.

23. A method of preparing an iron active electrode comprising calcining iron sulfate in an oxidizing atmosphere at a temperature in the range of from about 600° C. to about 850° C. for a time sufficient to produce an iron oxide with a trace amount of sulfate, adding carbonaceous material to the iron oxide, loading the iron oxide with the trace amount of sulfate and the carbonaceous material into an electrically conductive support, heating the iron oxide with the trace amount of sulfate and the carbonaceous material in a reducing atmosphere at an elevated temperature to produce activated iron with a trace amount of sulfide and with carbon being present in an amount not less than about 1% by weight of the activated iron, and forming the loaded support into an electrode plate.

24. The method of claim 23, wherein the iron oxide is loaded into the support by forming an aqueous paste of the iron oxide and rolling the paste into the support.

25. The method of claim 23, wherein the iron oxide is loaded into the support by forming an aqueous paste of the iron oxide and carbonaceous material and adding thereto a deflocculant and rolling the paste into the support.

26. The method of claim 23, wherein said support is metal fiber and the formed electrode plate is about 1 millimeter in thickness.

* * * * *